United States Patent
Everitt et al.

(10) Patent No.: US 6,989,840 B1
(45) Date of Patent: Jan. 24, 2006

(54) ORDER-INDEPENDENT TRANSPARENCY RENDERING SYSTEM AND METHOD

(75) Inventors: Cass W. Everitt, Pflugerville, TX (US); Rui M. Bastos, Santa Clara, CA (US); Mark J. Kilgard, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 646 days.

(21) Appl. No.: 09/944,988

(22) Filed: Aug. 31, 2001

(51) Int. Cl.
*G09G 5/02* (2006.01)

(52) U.S. Cl. .................... 345/592; 345/422; 345/581
(58) Field of Classification Search ................ 345/581, 345/582, 589, 422, 421, 426
See application file for complete search history.

(56) References Cited

U.S. PATENT DOCUMENTS

| | | | | |
|---|---|---|---|---|
| 5,920,687 A | * | 7/1999 | Winner et al. | 345/422 |
| 6,008,820 A | * | 12/1999 | Chauvin et al. | 345/502 |
| 6,326,964 B1 | * | 12/2001 | Snyder et al. | 345/419 |
| 6,411,294 B1 | * | 6/2002 | Furuhashi et al. | 345/421 |
| 6,466,210 B1 | * | 10/2002 | Carlsen et al. | 345/629 |
| 6,630,945 B1 | * | 10/2003 | MacInnis et al. | 345/768 |
| 6,670,955 B1 | * | 12/2003 | Morein | 345/421 |

OTHER PUBLICATIONS

Shade, J. et al. "Layered Depth Images".*
Tom Duff, "Compositing 3–D Rendered Images", Jul. 22–26, 1985, Murray Hill, NJ.
Segal et al, The Open GL® Graphics System: A Specification (Version 1.3), Aug. 14, 2001, Mountain View, CA.
Mammen, Abraham et al., "Rendering Transparency and Antialiasing Algorithims Implemented withe the Virtual Pixel Maps Technique", IEEE Computer Graphics & Applications, pp. 45–55, Jul. 1989.

* cited by examiner

*Primary Examiner*—Michael Razavi
*Assistant Examiner*—Chante' Harrison
(74) *Attorney, Agent, or Firm*—Zilka-Kotab, PC (57) ABSTRACT

A system, method and computer program product are provided for transparency rendering in a graphics pipeline. Initially, colored-transparency information is collected from a plurality of depth layers (i.e. colored-transparency layers, etc.) in a scene to be rendered. The collected colored-transparency information is then stored in memory. The colored-transparency information from the depth layers may then be blended in a predetermined order.

27 Claims, 8 Drawing Sheets

"A"
Previous Layer

"B"
Additional Present Layer

Figure 9

ORDER-INDEPENDENT TRANSPARENCY RENDERING SYSTEM AND METHOD

RELATED APPLICATION(S)

The present application is related to co-pending applications entitled "SYSTEM AND METHOD FOR USING AND COLLECTING INFORMATION FROM A PLURALITY OF DEPTH LAYERS" filed concurrently herewith under Ser. No. 09/945,444 and naming the same inventors as the present application, and "SYSTEM AND METHOD FOR DUAL-DEPTH SHADOW MAPPING" filed concurrently herewith under Ser. No. 09/944,990 and naming the same inventors as the present application, which are each incorporated herein by reference in their entirety.

FIELD OF THE INVENTION

The present invention relates to computer graphics, and more particularly to rendering at least partially transparent objects in a graphics pipeline.

BACKGROUND OF THE INVENTION

A major objective in graphics rendering is to produce images that are so realistic that the observer believes the image is real. A fundamental difficulty in achieving total visual realism is the complexity of accurately representing real-world visual effects. A scene can include a wide variety of textures, subtle color gradations, reflections, translucency, etc.

Transparency is particularly difficult to implement in a graphics pipeline due to many stringent requirements. In particular, per-fragment depth sorting is necessary for producing correct transparency rendering. While per-primitive sorting may be handled by a central processing unit (CPU), it is impossible to implement per-fragment sorting in most dedicated graphics pipelines. Moreover, any intersections among the objects/primitives frustrate the transparency calculations, since sorting order is not possible to establish at the primitive level. Since object intersection is often prevalent, transparency can simply not be handled by most dedicated graphics hardware.

The foregoing requirements are frustrating for most graphics application developers, because the natural order of scene traversal in a graphics pipeline (i.e. usually one object at a time) rarely satisfies these requirements. Objects can be complex, with their own transformation hierarchies. Even more troublesome, with advanced dedicated graphics hardware, the vertices and fragments of objects may be altered by user-defined per-vertex or per-fragment operations. When these features are employed, it becomes intractable to guarantee that fragments will arrive in sorted order for each pixel.

There is thus a need for handling transparency in a dedicated graphics pipeline without being frustrated by the requirements of the prior art.

DISCLOSURE OF THE INVENTION

A system, method and computer program product are provided for transparency rendering in a graphics pipeline. Initially, colored-transparency information is collected from a plurality of depth layers (i.e. colored-transparency layers, etc.) in a scene to be rendered. The collected colored-transparency information is then stored in memory. The colored-transparency information from the depth layers may then be blended in a predetermined order.

In one embodiment, the colored-transparency information may be collected from at least two depth layers in a scene (i.e. the closest visible transparent layer and the closest opaque layer). Further, the colored-transparency information may be stored in a plurality of texture maps. Each of the texture maps may correspond with one of the depth layers.

Prior to blending the colored-transparency information, the opaque objects in the scene may be rendered. Further, the memory may include a frame buffer. As yet another option, the blending may include linear blending.

In another embodiment, the collection and blending of the colored-transparency information from the depth layers may be done in multiple rendering passes. In the alternative, a register-combiner architecture may be utilized.

In the multiple rendering pass embodiment, colored-transparency information relating to a first depth layer may be collected during a first rendering pass. As an option, the depth information relating to the first depth layer may take the form of a shadow map to be used by subsequent rendering passes. The colored-transparency information relating to the first depth layer may take the form of a texture map to be used for rendering the final scene with transparency.

In a similar manner, the colored-transparency information relating to the at least one additional depth layer may be collected during at least one additional rendering pass. The at least one additional rendering pass may be taken from the same eye position from which a previous rendering pass is taken. A shadow-mapping feature may be enabled during the at least one additional rendering pass. Of course, the rendering passes may output depth layers in any form without the use of shadow-mapping techniques, and colored-transparency information may just as easily be collected from such rendering results. The depth information relating to the at least one additional depth layer may take the form of a shadow map to be used by subsequent rendering passes, and the colored-transparency information relating to the at least one additional depth layer may take the form of a texture map to be used for rendering the final scene with transparency.

In still another embodiment, the colored-transparency information relating to the at least one additional depth layer may be collected by removing a portion of the scene associated with a previous depth layer. In particular, this may be accomplished by performing a test. In an embodiment where the test works from a front of the scene to a back of the scene, the test determines whether the portion of the scene associated with the previous depth layer is in front of the at least one additional depth layer. If it is determined that the portion of the scene associated with the previous depth layer is in front of the at least one additional depth layer, the particular portion of the scene is removed. Of course, the test may also work from a front of the scene to a back of the scene.

In one aspect of the present embodiment, the test may calculate a difference between a first z-value relating to the previous layer and a second z-value relating to the at least one additional layer. In operation, the portion of the scene may be removed based on results of the test.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

DESCRIPTION OF THE PREFERRED EMBODIMENTS

Figure 1:
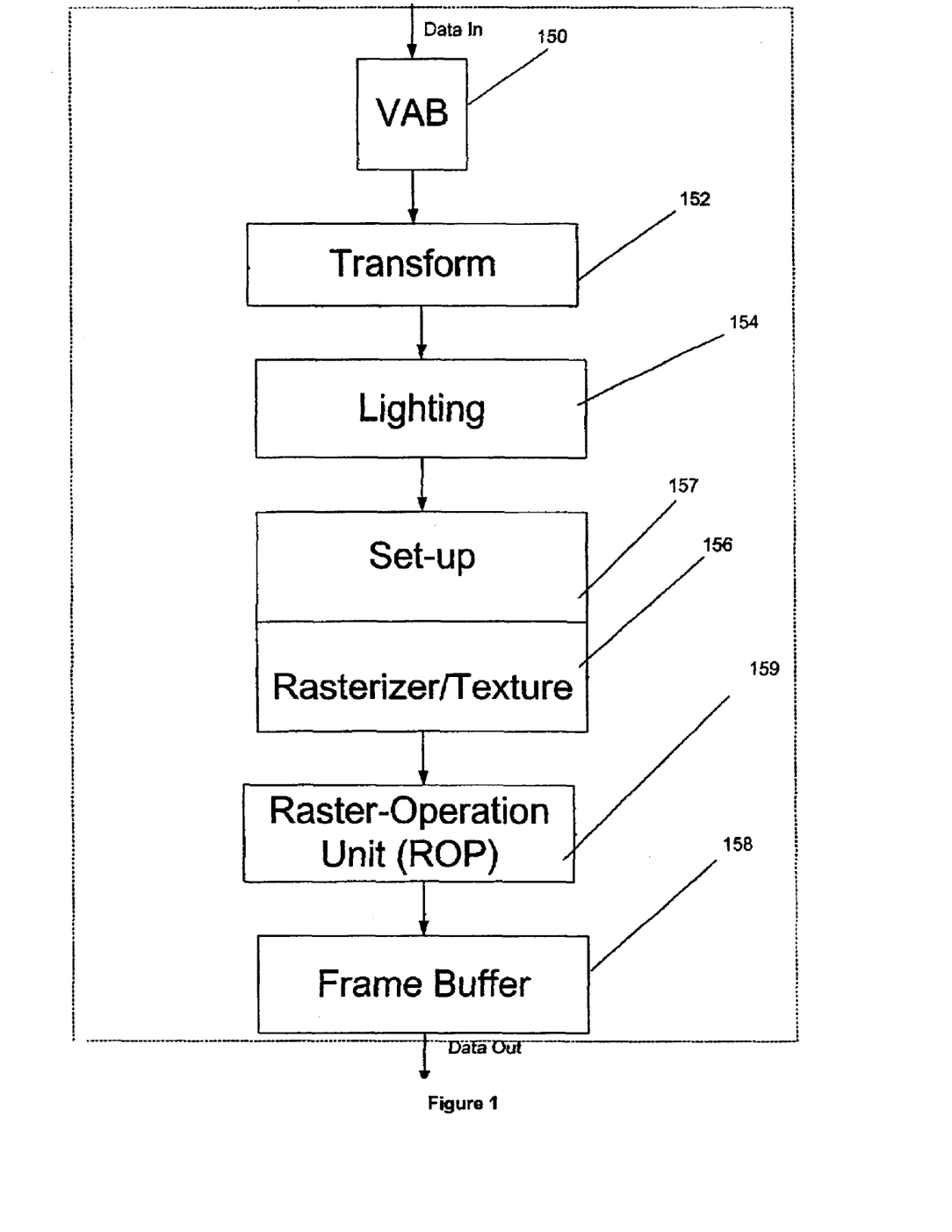
FIG. 1 is a system diagram illustrating the various components of one embodiment of the present invention.

FIG. 1 is a system diagram illustrating the various components of one embodiment of the present invention. As shown, the present embodiment may be divided into a plurality of modules including a vertex attribute buffer (VAB) 150, a transform module 152, a lighting module 154, a rasterization/texturing module 156 with a set-up module 157, a raster-operation module (ROP) 159, and a frame buffer 158.

In one embodiment, each of the foregoing modules may be situated on a single semiconductor platform. In the present description, the single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional CPU and bus implementation. Of course, the various modules may also be situated separately or in various combinations of semiconductor platforms per the desires of the user.

During operation, the VAB 150 is included for gathering and maintaining a plurality of vertex attribute states such as position, normal, colors, texture coordinates, etc. Completed vertices are processed by the transform module 152 and then sent to the lighting module 154. The transform module 152 generates vectors for the lighting module 154 to light.

The output of the lighting module 454 is screen space data suitable for the set-up module 157, which, in turn, sets up primitives. Thereafter, rasterization/texturing module 156 carries out rasterization and texturing of the primitives. As strictly an option, the rasterization/texturing module 156 may be equipped with shadow-mapping hardware for carrying out shadow mapping. Shadow mapping is a well-known technique for depicting objects of a scene with shadows, where the per-fragment shadow-mapping results are encoded in the color and alpha channels.

Output of the rasterization/texturing module 156 is then sent to the rasteroperation module 159 for performing alpha and z buffering tests. It should be noted that the alpha-test component of the hardware might be used to discard fragments/pixels that fail a depth-test performed during shadow mapping.

The output of the raster-operation module 159 is then sent to a frame buffer 158 for storage prior to being output to a display device (not shown).

Figure 2:
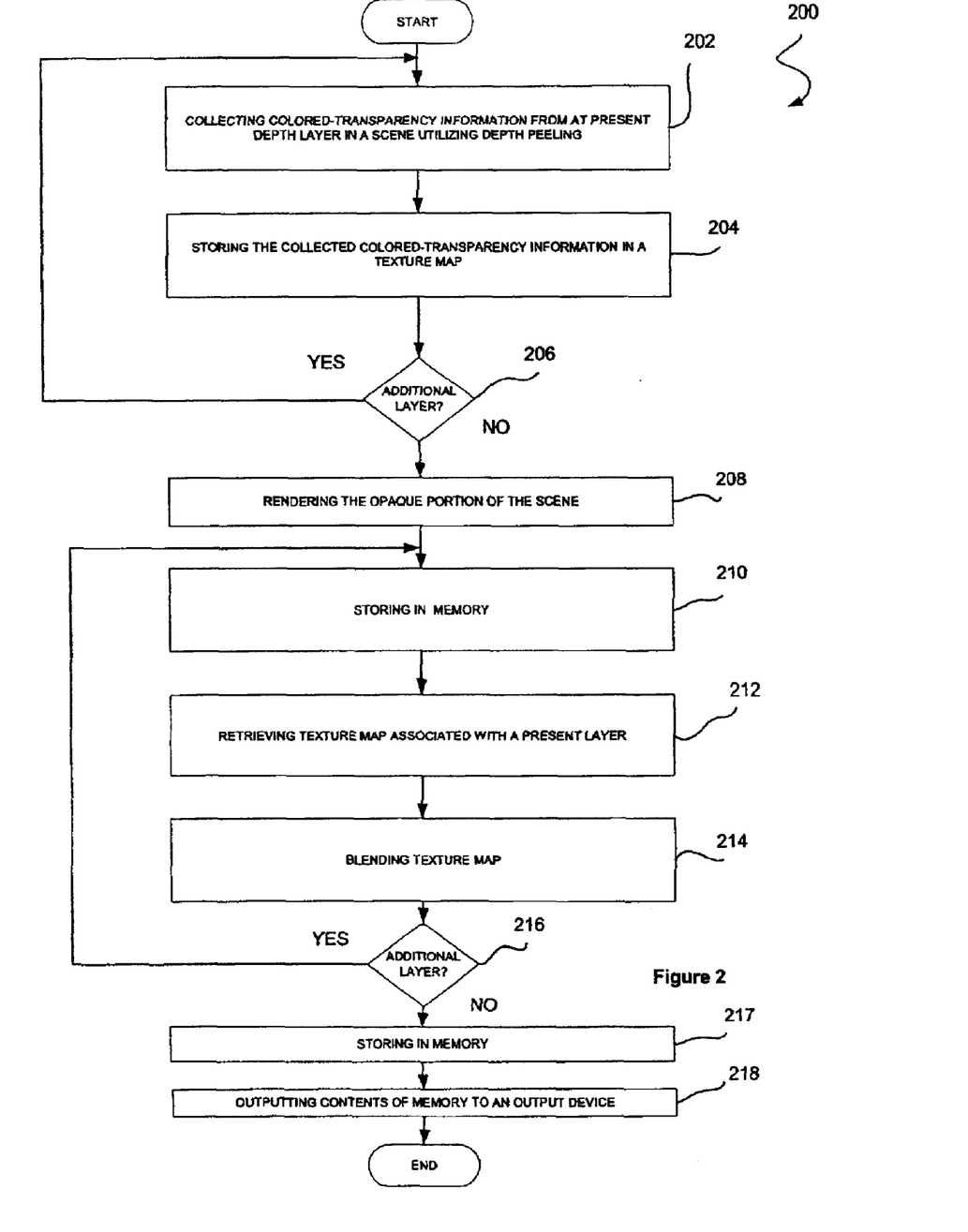
FIG. 2 illustrates a method for transparency rendering in a graphics pipeline.

FIG. 2 illustrates a method 200 for transparency rendering in a graphics pipeline. While the present method 200 is described in the context of the graphics pipeline shown in FIG. 1, it should be noted that the principles set forth herein may be implemented in any desired architecture. Initially, in operation 202, colored-transparency information is collected from a plurality of depth layers in a scene to be rendered.

In context of the present description, the colored-transparency information may include various color information such as R-values, G-values, B-values, alpha values, u-values, v-values, etc. along with any other information that may be required for blending purposes to show transparency at various depth levels in a rendered scene. In further embodiments, the colored-transparency information may include any data, parameters, or attributes that facilitate transparency being conveyed in a rendered scene.

Moreover, the various depth layers may each include a portion of the scene (i.e. objects, polygons, primitives, etc.) that resides at a predetermined depth level in the scene. In the context of the present description, the term "depth" may refer to a distance or vector length along any axis (i.e. z-axis) in a scene. In one context, such depth layers may include colored-transparency layers. It should be noted that this collection of multiple depth layer colored-transparency information may be collected in any desired manner. One exemplary technique will be set forth in greater detail during reference to FIG. 5.

Figure 3:
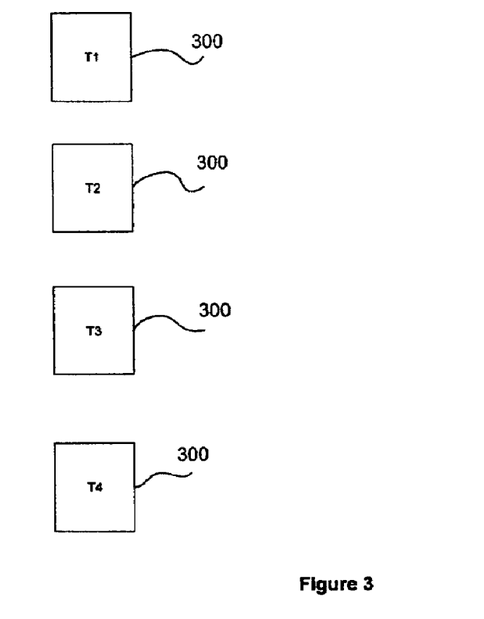
FIG. 3 illustrates a plurality of texture maps capable of storing the colored-transparency information collected during the method of FIG. 2.

Next, in operation 204, the collected colored-transparency information is stored in memory. In one embodiment, the colored-transparency information may be stored as texture maps. FIG. 3 illustrates a plurality of texture maps 300 capable of storing the colored-transparency information collected during operation 202 of FIG. 2. Such texture maps 300 may be stored in memory by the rasterization/texturing module 156 in any desired well-known manner. Further, each of the texture maps 300 may correspond with one of the depth layers.

While texture maps 300 constitute one possible way to store the colored-transparency information, it should be understood that any desired technique of storing the colored-transparency information may be employed per the desires of the user. Moreover, the memory may include the frame buffer 158, on-chip memory, or any other desired memory.

In one embodiment, the colored-transparency information may be collected from multiple depth layers in order to show transparency among multiple layers of objects in a scene. Per decision 206, additional colored-transparency information may be collected and stored in operations 202 and 204 for any desired number of depth layers.

Once all of the colored-transparency information has been collected for each of the desired transparent layers, the opaque objects in the scene are rendered in operation 208. In a back-to-front rendering of a scene with transparent surfaces, the opaque surface is the most distant visible surface with respect to the viewer/eye, with which the colored-transparency information of closer layers has to be blended.

Multiple rendering passes are then initiated for blending each of the transparent surfaces. During each pass, results of such rendering are stored in memory (i.e. frame buffer 158, onchip memory, etc.) in a standard manner. Note operation 210. During a first pass, the rendered opaque object is stored in the frame buffer 158. In operation 212, colored-transparency information collected during operation 202 is retrieved. During each pass, colored-transparency information associated with one of the colored-layers is retrieved. In the embodiment where texture maps 300 are utilized, the appropriate texture map 300 may be retrieved in operation 212.

As an alternative, the blending of the transparent surfaces may be done on-chip by using register combiners, which allows the sequential blending of the colored-transparency texture maps without requiring costly use of frame-buffer-interface bandwidth. More information regarding register combiners may be found with reference to an application entitled "IMPROVED GRAPHICS PIPELINE INCLUDING COMBINER STAGES" filed Mar. 20, 1999 naming David B. Kirk, Matthew Papakipos, Shaun Ho, Walter Donovan, and Curtis Priem as inventors, and which is incorporated herein by reference in its entirety.

It should be noted that colored-transparency information may be retrieved for the depth layers in any desired order. For example, colored-transparency information associated with a last depth layer may be retrieved after which colored-transparency information associated with a second-to-last depth layer may be retrieved, and so on. Of course, any suitable order may be acceptable.

Once the colored-transparency information has been retrieved, such information may be blended with the current contents of the memory. See operation 214. During the first pass, the results of rendering the opaque objects are blended with first colored-transparency information. During a second pass, the blended results of the opaque objects and the first colored-transparency information are blended with colored-transparency information associated with another one of the depth layers, and so on.

In the context of the present description, the blending operation 214 may refer to any act of combining colored-transparency information from multiple depth layers. In other words, the colored-transparency information from multiple depth layers may be utilized to generate a resultant rendered image. As an option, the blending may include linear blending, or any well-known blending algorithm. As yet another option, various alpha-value parameters may be used to show objects at an inner layer with less intensity than those at an outer layer. In the context of the graphics pipeline, a blending function that uses the alpha value of the incoming fragment may be used for back-to-front compositing.

The foregoing blending process is continued for a number of passes equal to a number of depth layers to be blended. Once it is determined in decision 216 that no further blending is required, the current blended results of the last rendering pass are stored in memory in operation 217. The contents of the memory may then be outputted to a display device in operation 218 in a manner that reflects the transparency.

Figure 4:
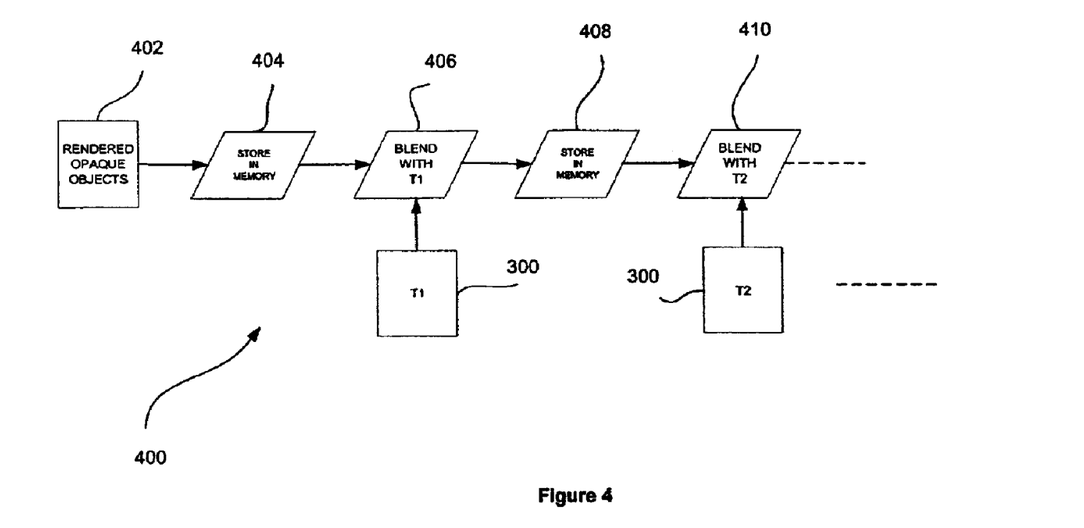
FIG. 4 illustrates the manner in which a first pair of colored-transparency texture maps may be blended in the context of the present invention.

FIG. 4 illustrates the manner 400 in which a first pair of texture maps may be blended in the context of the present invention. As shown, a rendered opaque object 402 is stored in memory (i.e. frame buffer 158, on-chip memory, etc.). Thereafter, such rendered opaque object 402 is blended with a first texture map 300 in operation 406. After the results of such blending operation are stored in memory in operation 408, the contents of the memory are blended with a second texture map 300 in operation 410.

By this design, the present technique allows the colored-transparency information to be blended for a plurality of depth layers in a predetermined order. In other words, last depth layer may be blended before second-to-last depth layer, and so forth. Of course, the order may take any form per the desires of the user. To this end, the current technique is a straightforward and convenient way to render scenes with transparency, because it does not require that the objects/primitives in the scene be rendered in sorted order.

Figure 5:
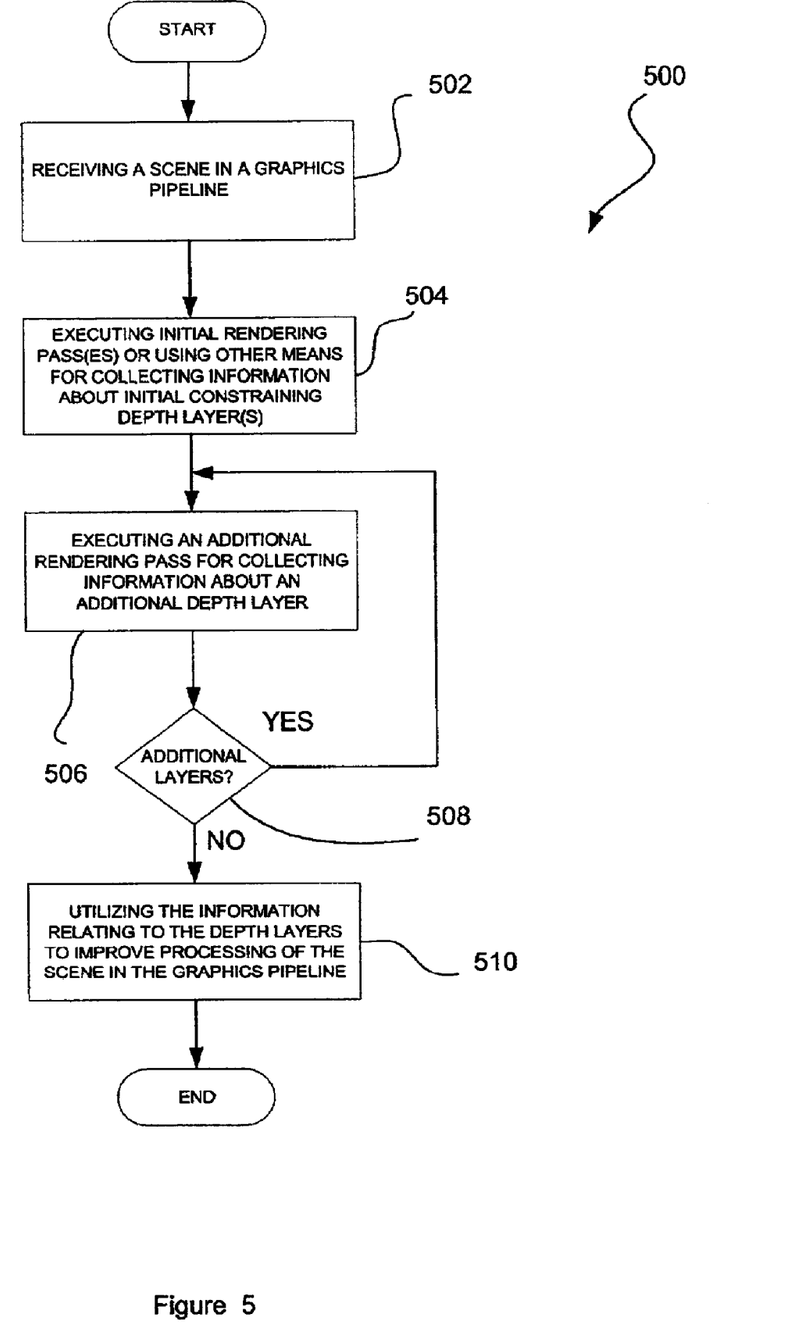
FIG. 5 illustrates an exemplary process for collecting and using information in a graphics pipeline such as that shown in FIG. 1, in accordance with the method of FIG. 2.

FIG. 5 illustrates a method 500 for collecting and using information in a graphics pipeline such as that shown in FIG. 1, in accordance with operation 202 of FIG. 2. While the present method 500 is described in the context of the graphics pipeline shown in FIG. 1, it should be noted that the principles set forth herein may be implemented in any desired architecture.

Initially, in operation 502, a scene is received in the graphics pipeline. In the context of the present description, a scene may refer to any particular set of objects, polygons, primitives, etc. that are to be rendered. In particular, the scene is received in the rasterizer/texture module 156 of the pipeline of FIG. 1.

Next, in operation 504, initial rendering passes may be executed or user-created buffer received for collecting information (i.e. colored-transparency information) about initial depth layers. It should be noted that the initial depth layers may be collected in any desired manner. In use, the initial depth layers may be used as constraining depth layers which inherently define a plurality of depth constraints. The manner in which such initial depth layers operate as constraining depth layers will be set forth hereinafter in greater detail.

In the context of the present description, each rendering pass refers to any separate set of processes carried out by the rasterizer/texture module 156. More information regarding the initial rendering passes in operation 504 will be set forth in greater detail during reference to FIG. 6. In addition to or as an alternative for the initial rendering passes, one or more depth layers, in the form of shadow maps, may be directly received in the graphics pipeline. For more information regarding shadow mapping, reference may be made to a patent entitled "SYSTEM, METHOD AND ARTICLE OF MANUFACTURE FOR SHADOW MAPPING" which was filed Dec. 5, 2000 under Ser. No. 09/730,639, and which is incorporated herein by reference.

The information that is collected in operation 504 may include depth values (i.e. z-values), transparency information, color information, or absolutely any other type of data, parameters, or attributes that may be used to improve the realism resulting from the rendering process. Moreover, similar to each of the depth layers set forth in the present description, the constraining depth layers may include a portion of the scene (i.e. pixels corresponding to objects, polygons, primitives, etc.) that resides at predetermined depth levels in the scene. In the context of the present description, the term "depth" may refer to a distance or vector length between an eye/camera location and the corresponding fragment coordinates in a scene.

Thereafter, in operation 506, at least one additional rendering pass is executed for collecting information about additional depth layers. As indicated by decision 508, the operation 506 is repeated for each additional depth layer desired. For reasons that will soon become apparent, the results of the rendering passes of operations 504 and 506 may be stored in memory such as a texture member associated with the graphics pipeline.

It should be noted that a plurality of depth tests may be performed on the results from each additional rendering pass as well as on other depth layers. Utilizing such multiple depth tests and multiple depth layers, information may be collected from a desired depth layer. More information regarding the at least one additional rendering pass and the associated multiple depth tests in operation 506 will be set forth in greater detail during reference to FIG. 7.

Once it is determined in decision 508 that no additional depth layers are desired, the information relating to each of the depth layers may be utilized to improve processing of the scene in the graphics pipeline. See operation 510. In particular, the information may be used to improve the realism resulting from the rendering process in the graphics pipeline.

Figure 6:
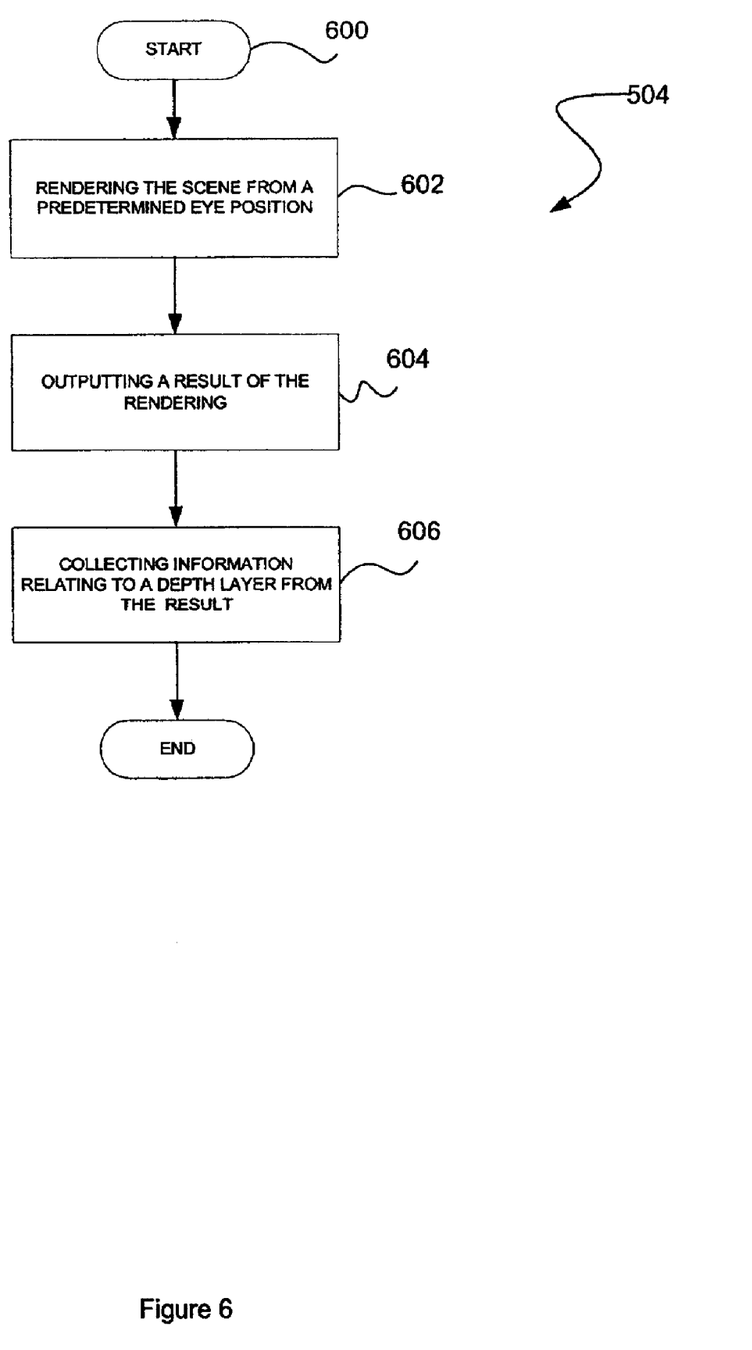
FIG. 6 illustrates a method associated with the initial rendering pass(es) of the process of FIG. 5.

FIG. 6 illustrates a method 600 associated with the initial rendering passes, in accordance with operation 504 of FIG. 5. As shown, the scene is initially rendered from a predetermined eye position in a manner that is well known in the art. See operation 602.

A result of the operation 602 is then outputted in operation 604. It should be noted that the result of operation 602 may take any form that includes at least a portion of a rendered scene from which the information (i.e. data, parameters, attributes, etc.) relating to the constraining depth layers may be collected. Note operation 606.

As mentioned earlier, the rasterization/texturing module 156 may be equipped with shadow-mapping hardware for carrying out shadow mapping. In such case, the results of operation 602 may take the form of shadow maps. Similar to other types of rendering results, information (i.e. data, parameters, attributes, etc.) relating to the constraining depth layers may be collected in the form of shadow maps.

Figure 7:
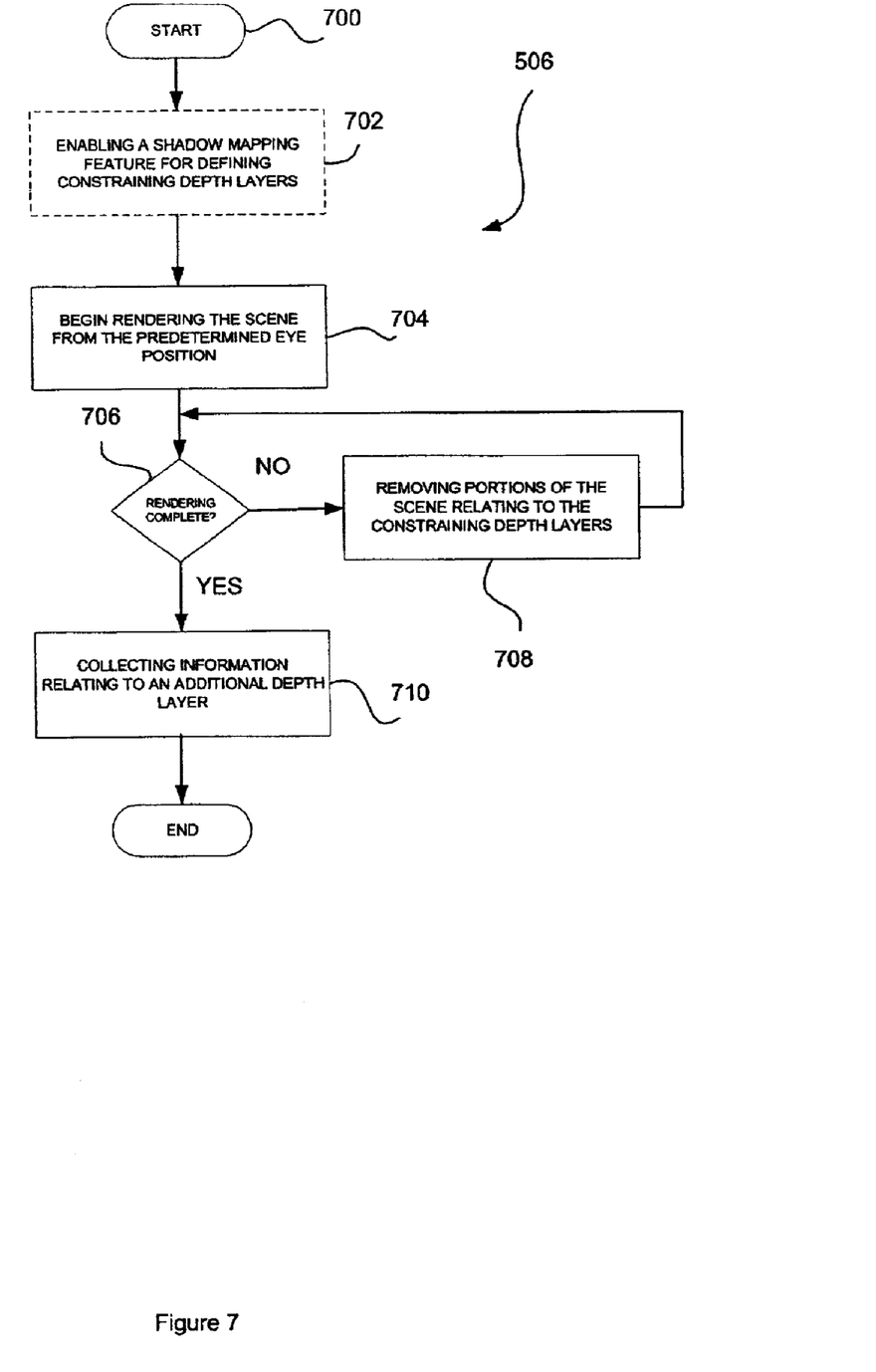
FIG. 7 illustrates a method for executing one pass of the at least one additional rendering pass of the process of FIG. 5.

FIG. 7 illustrates a method 700 for executing the at least one additional rendering pass, in accordance with operation 506 of FIG. 5. Initially, in operation 704, the scene is rendered utilizing the rasterizer/texture module 156 of the graphics pipeline. For reasons that will soon become apparent, it is important that the scene be rendered from the predetermined eye position associated with the first rendering pass of operation 504 of FIG. 5.

In the context of an embodiment where shadow-mapping and alpha-test hardware is optionally utilized, an additional optional operation may take place. In particular, a shadow-mapping feature may be enabled during the at least one additional rendering pass in operation 702. The shadow-mapping feature serves for defining the previous depth layers. In the first instance of operation 704 of FIG. 7, the previous depth layers would be defined as the constraining depth layers, and so forth. By utilizing the shadow-mapping and alpha-test hardware in such a manner, another shadow map is outputted, which may be utilized as or added to the constraining depth layers during subsequent rendering passes.

In an embodiment where the shadow-mapping and alpha-test hardware is not utilized, the constraining depth layers may simply be stored during the previous rendering pass in any desired manner.

The pendency of operation 704 is monitored in decision 706. While the at least one additional rendering pass is taking place, portions of the scene relating to the constraining depth layers may be removed in operation 708. In one embodiment, a particular set of tests may be employed to facilitate such removal. It should be noted that such tests may involve as many depth layers/constraints as necessary during each rendering pass in order to collect the desired information. More information on this test will be set forth in greater detail during reference to FIG. 8.

The purpose of operation 708 is to remove any objects, polygons, primitives, etc. or portions (in the form of fragments) thereof related to any constraining depth layers that may be obstructing the at least one additional depth layer that is currently being rendered. By removing such portions of the scene, a result of the rendering pass may be effectively used to extract the information relating to the desired depth layer. Such removal process may be referred to as "depth peeling" or "Z-peeling" due to the manner in which it "peels" each of the portions of the scene relating to the constraining depth layer(s).

Once it is determined that the at least one additional rendering pass is complete in decision 706, the information is collected from the results. See operation 710. Of course, such method 700 may be repeated as many times is needed to collect information from any desired number of depth layers.

Figure 8:
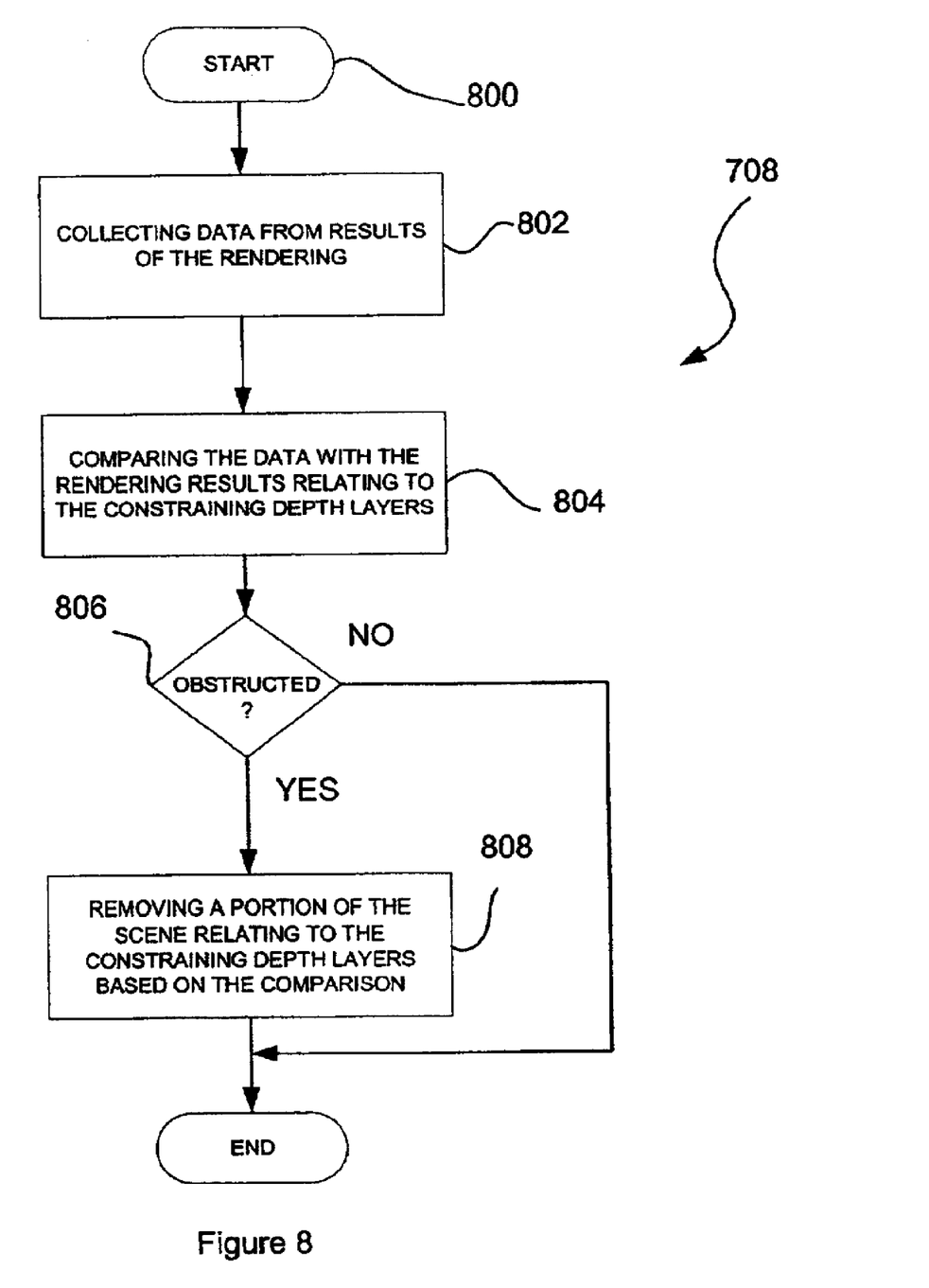
FIG. 8 illustrates a method of conducting a test to remove portions of a scene by "depth peeling" during one of the at least one additional rendering passes of FIG. 7.

FIG. 8 illustrates a method 800 of conducting a test for use during removal of portions of a scene during "depth peeling", in accordance with operation 708 of FIG. 7. While the at least one additional rendering pass is occurring, preliminary data from results of the rendering are collected in operation 802. Such data are compared with the rendering results associated with the constraining depth layers. See operations 804 and 806. More information on the particular values associated with the data of operation 802 and the rendering results of operation 804 will be set forth during reference to FIG. 9.

In the embodiment where shadow-mapping hardware is optionally utilized, it should be noted that the rendering results take the form of shadow maps associated with the constraining depth layers. As will soon become apparent, a portion of the scene relating to the previous depth layer is removed based on the comparison in operation 808.

Figure 9:
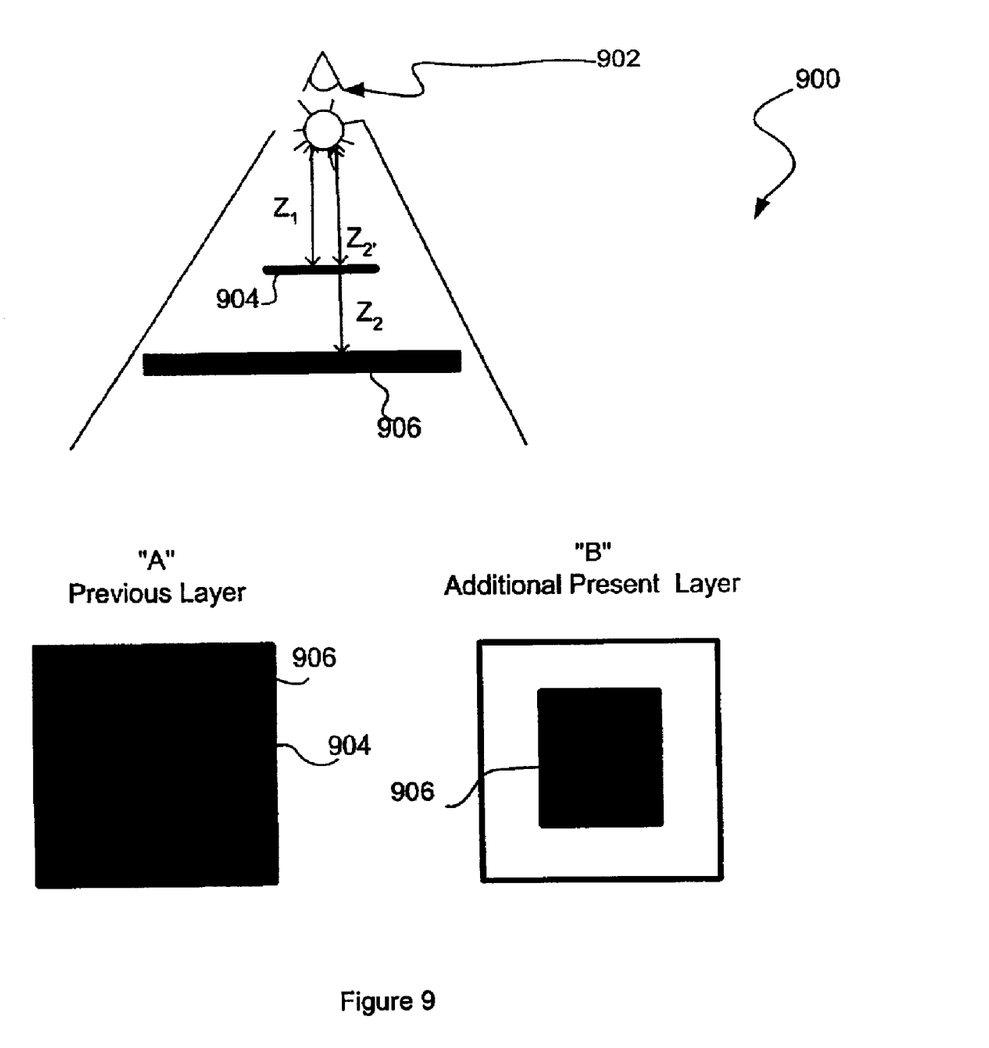
FIG. 9 illustrates the various parameters involved during the test of FIG. 8.

FIG. 9 illustrates the various parameters involved during the test of FIG. 8. As shown, a scene 900 is being rendered during the at least one additional pass from the predetermined eye position associated with the previous rendering pass. Note eye position 902. It should be noted that the example of FIG. 9 does not take into account the possibility of the existence of multiple previous layers for simplicity purposes.

In accordance with operation 802 of FIG. 8, a constraining z-value ($Z_1$) relating to a portion 904 of the scene 900 associated with the constraining depth layer is collected. Further, in accordance with operation 804 of FIG. 8, a second z-value ($Z_2$) relating to a portion 906 of the scene 900 associated with the at least one additional depth layer is collected. The "peeling" process most prevalently happens at the fragment level, so the portions 904 and 906 are generally partial polygons.

It should be noted that the second z-value ($Z_2$) may be greater than or equal to first z-value ($Z_1$) depending on whether a portion 904 of the scene 900 associated with the previous depth layer is in front of the portion 906 of the scene 900 associated with the at least one additional depth layer. Note the second z-value ($Z_2$) and the second z-value prime ($Z_{2'}$), respectively.

In other words, during operation 804 of FIG. 8, difference values are calculated between constraining z-values ($Z_1$) relating to the constraining depth layers and z-values ($Z_2$) relating to the at least one additional depth layer. Upon no difference being calculated between the constraining z-values ($Z_1$) relating to the constraining depth layers and the z-values ($Z_2$) relating to the at least one additional depth layer (when the second z-value is $Z_{2'}$), it may be assumed that the portion 904 of the scene 900 associated with the constraining depth layers obstruct the portion 906 of the scene 900 associated with the at least one additional depth layer. See decision 806 of FIG. 8. In such case, the portion 904 of the scene 900 associated with the constraining depth layers is removed before the results of the rendering are written to the frame buffer. Note the transition from "A", where the portion 904 exists, to "B", where the portion 904 is "peeled", to expose the portion 906 of the scene 900 associated with the at least one additional depth layer.

In the foregoing embodiment, the tests work from a front of the scene 900 to a back of the scene 900. Of course, the tests may also work from a back of the scene 900 to a front of the scene 900. Such back-to-front embodiment may be implemented by changing the decision 806 of FIG. 8. As an option, various other operations (i.e. <, =, <=, =>, !=, etc.) may be used during the course of the aforementioned tests.

It is thus now readily apparent that, by the nature of these tests, it is important that the additional rendering pass be taken from the predetermined eye position associated with the previous rendering passes, since, for the peeling tests to be meaningful, the fragment coordinates compared by the tests must belong to the exact same point in space. That is, the multiple rendering passes must match up exactly at fragment coordinates, which implies rendering the scene from the same eye position.

Similarly, it is also readily apparent that, by the same nature of the tests, it is important that all the rendering passes use the exact same method for producing depth values, since a slight difference in depth values for otherwise matching fragments might cause incorrect results for the depth tests. Variance in depth values may arise due to using different methods for producing such coordinates.

The present tests thus output the nearest, second nearest, etc. fragments at each pixel. The present technique may take n passes over a scene in order to get n layers deep into the scene.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for transparency rendering in a graphics pipeline, comprising:
   (a) collecting colored-transparency information from a plurality of depth layers in a scene to be rendered utilizing depth peeling including peeling each portion of a scene in relation to a constraining depth layer;
   (b) storing the collected colored-transparency information in memory; and
   (c) blending the colored-transparency information from the depth layers in a predetermined order;
   wherein a first rendering pass and at least one additional rendering pass are executed, and a shadow-mapping feature is enabled during the at least one additional rendering pass for defining a previous depth layer.

2. The method as recited in claim 1, wherein the colored-transparency information is collected from at least two depth layers.

3. The method as recited in claim 1, wherein the colored-transparency information is stored in a plurality of texture maps.

4. The method as recited in claim 3, wherein each of the texture maps corresponds with one of the depth layers.

5. The method as recited in claim 4, wherein the texture maps are stored in memory.

6. The method as recited in claim 1, and further comprising rendering opaque objects in the scene.

7. The method as recited in claim 6, the opaque objects in the scene are rendered prior to blending the colored-transparency information therewith.

8. The method as recited in claim 1, wherein the memory includes a frame buffer.

9. The method as recited in claim 1, wherein the blending includes linear blending.

10. The method as recited in claim 3, wherein the first rendering pass produces a shadow map relating to the first depth layer.

11. A method for transparency rendering in a graphics pipeline, comprising:
    (a) collecting colored-transparency information from a plurality of depth layers in a scene to be rendered utilizing depth peeling including peeling each portion of a scene in relation to a constraining depth layer;
    (b) storing the collected colored-transparency information in memory; and
    (c) blending the colored-transparency information from the depth layers in a predetermined order;
    wherein the depth peeling includes executing a first rendering pass for collecting colored-transparency information relating to a first depth layer, and executing additional rendering passes for collecting additional colored-transparency information relating to additional depth layers;
    wherein a shadow-mapping feature is enabled during the additional rendering passes for defining a previous depth layer.

12. The method as recited in claim 3, wherein the additional rendering passes are taken from the same eye position from which the first rendering pass is taken.

13. The method as recited in claim 1, wherein the colored-transparency information is collected utilizing the depth peeling including executing the first rendering pass for generating a shadow map from which first colored-transparency information relating to a first depth layer is collected, and executing a plurality of the additional rendering passes with the shadow-mapping feature enabled and from the same eye position from which the first rendering pass is taken for collecting additional colored-transparency information relating to additional depth layers.

14. The method as recited in claim 13, wherein the additional colored-transparency information relating to the additional depth layers is collected by removing a portion of the scene associated with the previous depth layer.

15. The method as recited in claim 14, wherein the additional colored-transparency information relating to the additional depth layers is collected by performing a test to determine which portion of the scene to remove.

16. The method as recited in claim 15, wherein the test determines whether the portion of the scene is behind the previous depth layer.

17. The method as recited in claim 16, wherein the portion of the scene is removed upon the test determining that the portion of the scene is behind the previous depth layer.

18. The method as recited in claim 17, wherein the test calculates a difference between a previous z-value relating to the previous depth layer and a present z-value relating to one of the additional depth layers.

19. The method as recited in claim 18, wherein the portion of the scene is removed upon no difference being calculated between the previous z-value relating to the previous depth layer and the present z-value relating to one of the additional depth layers.

20. The method as recited in claim 19, wherein the z-values relating to all depth layers are produced with the same interpolation-related method for improving an accuracy of the test.

21. A computer program product for transparency rendering in a graphics pipeline, comprising:
   (a) computer code for collecting colored-transparency information from a plurality of depth layers in a scene to be rendered utilizing depth peeling including peeling each portion of a scene in relation to a constraining depth layer;
   (b) computer code for storing the collected colored-transparency information in memory; and
   (c) computer code for blending the colored-transparency information from the depth layers in a predetermined order;
   wherein a first rendering pass and at least one additional rendering pass are executed, and a shadow-mapping feature is enabled during the at least one additional rendering pass for defining a previous depth layer.

22. A system for transparency rendering in a graphics pipeline, comprising:
   (a) logic for collecting colored-transparency information from a plurality of depth layers in a scene to be rendered utilizing depth peeling including peeling each portion of a scene in relation to a constraining depth layer;
   (b) memory for storing the collected colored-transparency information; and
   (c) a renderer coupled to the memory for blending the colored-transparency information from the depth layers in a predetermined order;
   wherein a first rendering pass and at least one additional rendering pass are executed, and a shadow-mapping feature is enabled during the at least one additional rendering pass for defining a previous depth layer.

23. A system for transparency rendering in a graphics pipeline, comprising:
   (a) logic for collecting colored-transparency information from a plurality of depth layers in a scene to be rendered utilizing depth peeling including peeling each portion of a scene in relation to a constraining depth layer;
   (b) memory for storing the collected colored-transparency information; and
   (c) register combiners coupled to the memory for blending the colored-transparency information from the depth layers in a predetermined order;
   wherein a first rendering pass and at least one additional rendering pass are executed, and a shadow-mapping feature is enabled during the at least one additional rendering pass for defining a previous depth layer.

24. A method for transparency rendering in a graphics pipeline, comprising:
   (a) collecting colored-transparency information from at least two depth layers in a scene utilizing depth peeling including peeling each portion of a scene in relation to a constraining depth layer;
   (b) storing the collected colored-transparency information in the form of a plurality of texture maps;
   (c) rendering the opaque objects in the scene;
   (d) storing the rendering of the opaque objects in memory;
   (e) identifying one of the depth layers to be blended;
   (f) blending the colored-transparency information from the identified depth layer with contents of the memory utilizing a corresponding one of the texture maps;
   (g) storing results of (f) in the memory; and
   (h) repeating acts (e)–(g);
   wherein a first rendering pass and at least one additional rendering pass are executed, and a shadow-mapping feature is enabled during the at least one additional rendering pass for defining a previous depth layer.

25. A computer program product for transparency rendering in a graphics pipeline, comprising:
   (a) computer code for collecting colored-transparency information from at least two depth layers in a scene utilizing depth peeling including peeling each portion of a scene in relation to a constraining depth layer;
   (b) computer code for storing the collected colored-transparency information in the form of a plurality of texture maps;
   (c) computer code for rendering opaque objects in the scene;
   (d) computer code for storing the opaque object in memory;
   (e) computer code for identifying one of the depth layers to be blended;
   (f) computer code for blending the colored-transparency information from the identified depth layer with contents of the memory utilizing a corresponding one of the texture maps;
   (g) computer code for storing results of (f) in the memory; and
   (h) computer code for repeating (e)–(g);
   wherein a first rendering pass and at least one additional rendering pass are executed, and a shadow-mapping feature is enabled during the at least one additional rendering pass for defining a previous depth layer.

26. A method for transparency rendering in a graphics pipeline, comprising:
   (a) collecting colored-transparency information from a plurality of depth layers in a scene to be rendered utilizing depth peeling including peeling each portion of a scene in relation to a constraining depth layer, by:
      (i) executing a first rendering pass for generating a shadow map and for collecting first colored-transparency information relating to a first depth layer, and
      (ii) executing additional rendering passes with a shadow-mapping feature enabled and from the same eye position from which the first rendering pass is taken for generating additional shadow maps and for collecting additional colored-transparency information relating to additional depth layers;
   (b) storing the collected colored-transparency information in memory; and
   (c) blending the colored-transparency information from the depth layers;
   wherein the shadow-mapping feature is enabled during the additional rendering passes for defining a previous depth layer.

27. A computer program product for transparency rendering in a graphics pipeline, comprising:
  (a) computer code for collecting colored-transparency information from a plurality of depth layers in a scene to be rendered utilizing depth peeling including peeling each portion of a scene in relation to a constraining depth layer, by:
    (i) executing a first rendering pass for generating a shadow map and for collecting first colored-transparency information relating to a first depth layer, and
    (ii) executing additional rendering passes with a shadow mapping feature enabled and from the same eye position from which the first rendering pass is taken for generating additional shadow maps and for collecting additional colored-transparency information relating to additional depth layers;
  (b) computer code for storing the collected colored-transparency information in memory; and
  (c) computer code for blending the colored-transparency information from the depth layers;
    wherein the shadow-mapping feature is enabled during the additional rendering passes for defining a previous death layer.

* * * * *

UNITED STATES PATENT AND TRADEMARK OFFICE
CERTIFICATE OF CORRECTION

PATENT NO. : 6,989,840 B1  
APPLICATION NO. : 09/944988  
DATED : January 24, 2006  
INVENTOR(S) : Everitt et al.

Page 1 of 1

It is certified that error appears in the above-identified patent and that said Letters Patent is hereby corrected as shown below:

Claim 27, col. 14, line 11: please replace "death" with --depth--.

Signed and Sealed this
Twelfth Day of March, 2013

Teresa Stanek Rea
*Acting Director of the United States Patent and Trademark Office*